Oct. 4, 1966 P. S. BRYER 3,276,651

ROLLER GUIDE FOR WEB TRANSPORT MECHANISMS

Filed April 27, 1964

INVENTOR
PHILIP S. BRYER

BY Robert G. Clay

ATTORNEY

United States Patent Office 3,276,651

Patented Oct. 4, 1966

3,276,651

ROLLER GUIDE FOR WEB TRANSPORT MECHANISMS

Philip S. Bryer, Los Angeles, Calif., assignor to Ampex Corporation, Redwood City, Calif., a corporation of California Filed Apr. 27, 1964, Ser. No. 362,784
6 Claims. (Cl. 226—190)

This invention relates to guides for high performance web transport systems, and more particularly to low inertia rollers providing guiding of the web in the transverse direction.

Modern web transport systems are often required to maintain precise control of the web member while the member is being advanced at extremely high speeds. In a magnetic tape transport for digital systems, for example, the tape must be moved in either direction at high speed, but also started or stopped in minimum time. Data must be packed so densely on the tape that fluctuations transverse to the axis of movement of the tape can introduce errors into the data being recorded or reproduced. Thus, a seven track magnetic tape using one of the standard bit densities (200, 556 or 800 bits per inch) may suffer from excessive time displacement between the nominally parallel bits of a given character or frame. The effects arising from lateral displacement of the tape are generally referred to as dynamic skew. The dynamic skew must be maintained within specified limits, or the bit densities of data on the tape must be reduced, or else redundant and expensive clocking schemes must be employed to avoid error.

The seriousness of the dynamic skew problem to a high performance system is more evident when it is appreciated that a major source of this error is the lateral dimensional variation in the tape itself.

Standard procedures for preparing tapes usually employ cutting or slitting of individual tapes from a sheet of previously coated material, but whether the tapes are prepared by this or other means, dimensional variations of the order of a few thousandths of an inch are often introduced. Variations of this magnitude, however, introduce time displacements of many microseconds, if not compensated for in some manner by the tape guiding and handling system.

The tape may vary in average width, and also have an edge waviness, dependent upon the size and design of the tape slitter. While grinding of the side surfaces of wound reels or other techniques may be utilized to reduce lateral dimensional variations, magnetic tape transports are expected to operate with standard computer reels, so that for practical purposes such special preparatory steps cannot be used. A number of mechanisms have been employed for guiding a tape so as to minimize dynamic skew introduced by lateral dimensional variations in the tape. Such mechanisms have usually employed a fixed guide having a fixed shoulder against which one edge of the tape may be urged under light force. The means for urging the tape against the shoulder may comprise mechanical biasing means, pneumatic means, or associated tape guiding means. Mechanisms of this type, however, introduce high friction into the tape path, and prior art designs are generally also unable to compensate for tape width variations.

High friction in the tape path is particularly not desired in the single capstan type of digital tape transport. In this type of transport, a low friction tape path is used in conjunction with a balanced tension and a high wraparound angle of tape on the capstan, such that the tape is held in fixed relation to the capstan without stress. A high torque to inertia capstan motor is started, stopped or rotated in either direction solely by the control of energizing current, and no mechanical engaging elements or pneumatic elements need be employed to accelerate and decelerate the tape. With this arrangement, however, neither high friction nor high inertia in the tape path can be tolerated. The transport itself introduces little variation, partly because of the tape path configuration and partly because of the freedom of the tape from stress, so that the problem of reducing dynamic skew largely centers upon the guide means for compensating for tape width variations without introducing high friction or inertia.

It is, therefore, an object of this invention to provide an improved low inertia guide roller for web transport systems.

Another object of this invention is to provide a low inertia guide roller capable of compensating for tape width variations in a digital magnetic tape transport system.

These and other objects of the invention are met by an improved low inertia guide roller which has one fixed reference surface and another movable and mechanically biased reference surface for the web. The roller surface itself is defined by a sleeve mounted on ball bearings on a central shaft, the outer race for one of the ball bearings being flanged to provide a fixed reference shoulder. On the opposite side of the web, the web engages a ceramic shoulder element coupled to a transversely movable but rotatably fixed sleeve which is urged in the direction toward the tape. The movable shoulder element is nominally separated from the fixed shoulder element by a distance substantially equal to the minimum tape width dimension, and is held normal to the plane of the tape.

A better understanding of the invention may be had by reference to the following description, taken in conjunction with the accompanying drawing, in which.

Figure 1:
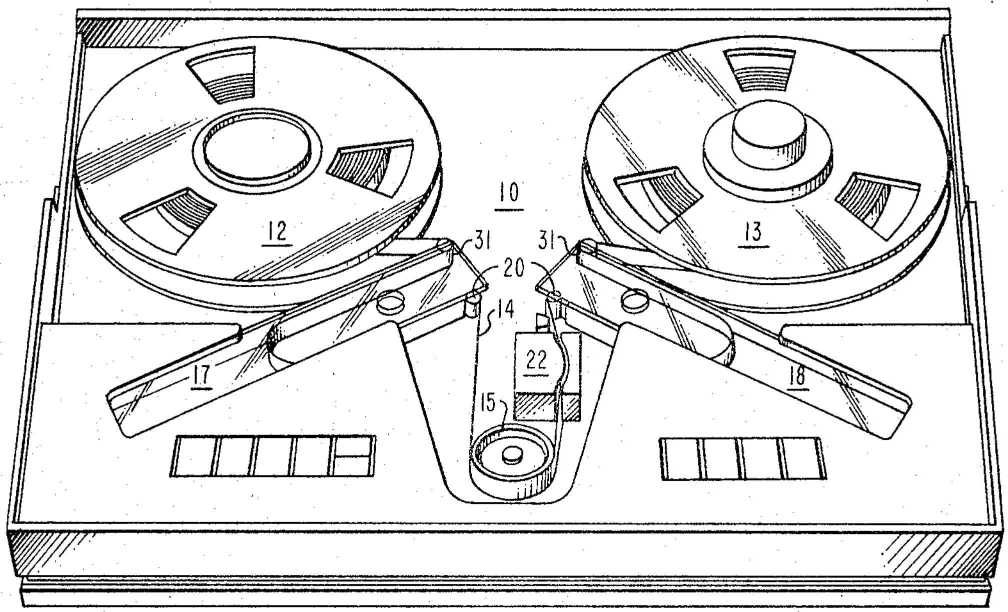
FIG. 1 is a perspective view of a part of a tape transport mechanism, showing the front panel and tape guiding arrangement.
Figure 2:
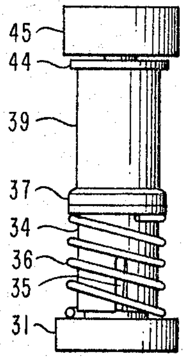
FIG. 2 is a side view of a low inertia roller guide in accordance with the invention useful in the arrangement of FIG. 1.
Figure 4:
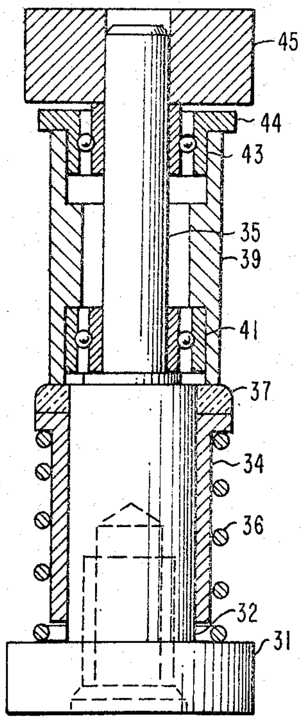
FIG. 4 is a side cross sectional view of the arrangement of FIGS. 2 and 3, taken along the line 4—4 of FIG. 3.
Figure 5:
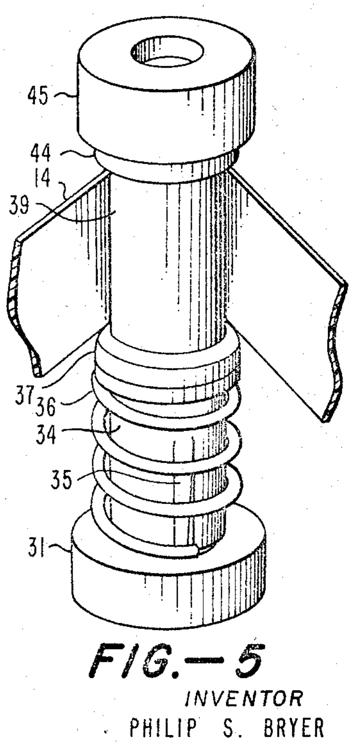
FIG. 5 is an enlarged fragmentary perspective view of the roller guide of FIGS. 2 to 4, showing the manner in which a tape is engaged.
Figure 3:
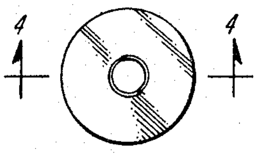
FIG. 3 is an end view of the roller guide of FIG. 2.

A high performance web transport system is exemplified by the digital magnetic tape transport is shown in general form in FIG. 1. The principal operative elements for handling the tape are mounted on a front panel 10, and include a supply reel 12 and a takeup reel 13 between which a tape 14 may be moved bi-directionally. The motors for the reels 12, 13, and the associated servo systems, have not been shown, in order to simplify the description. Similarly the associated drive systems and control circuits, including the means for sensing loop position and tape velocity, the capstan drive, and the recording and reproducing circuits, have been omitted.

Control of tape speed and direction is effected by a single capstan 15 operated by a high torque-to-inertia motor (not shown) as previously discussed. Between each reel 12, 13 and the capstan 15 is disposed a different vacuum chamber 17, 18 respectively, for maintaining balanced tension on each side of the tape wrapped about the capstan 15. The vacuum outlet means, loop sensing means and other elements used in conjunction with vacuum chamber 17, 18 cooperate to maintain a differential pressure across the tape loop within the chamber 17, 18, and to drive the motors for the reels 12, 13, so as to keep the loop lengths within controlled limits. At the vacuum chamber end which is closest to each of the reels, and which may be referred to as the exit end, the tape 14 is mechanically isolated from the capstan, and the guiding problem is accordingly not severe. At the exit ends of the chambers it may be desired to use guide rollers 20 for actuating tachometers (not shown) to provide tape velocity signals to the reel servo systems.

The magnetic recording and reproducing heads 22 for the system are positioned adjacent the capstan 15, between the capstan 15 and one of the vacuum chambers 18. At the entry end of each vacuum chamber 17, 18, is mounted a low inertia low friction guide roller 30, such as is disclosed in accordance with the present invention.

The guide rollers 30 (referring now to FIGS. 2 to 5), provide the desired referencing of the lateral position of the tape, but additionally present an extremely low mechanical impedance in the tape path. Each guide roller is mounted on a hub 31, which is fixed to the front panel 10 (FIG. 1). A central guide shaft 32 is coupled to the hub 31 and fixed against rotation. The axis of the guide shaft 32 defines a central reference axis for the guide rollers 30 and its cross sectional dimension is varied so as to include a relatively wider base portion and a narrow terminal portion. Hereafter, the part of an element closest to the front panel 10 will be referred to as the inner part or edge, and the part closest to the free end of the structure or any part of it will be referred to as the outer part or edge.

The inner segment of the guide shaft 32 is encompassed by a sleeve 34 which is axially slidable along the guide shaft 32. The sleeve has an outer flanged end and includes a tab 35 which is extended into a longitudinal slot in 32, so as to hold the sleeve 34 against rotation. A spring 36 surrounding the sleeve 34 engages both the shoulder and the hub 31, to urge the sleeve outwardly on the guide shaft 32. At the outer edge of the sleeve 34 is bonded a ceramic washer 37 which has a rounded or tapered outer edge forming a movable shoulder element for engagement with the inner edge of a tape 14.

The tape roller surface itself is provided by a roller sleeve 39, centered substantially on the path of the tape 15. The roller sleeve is rotatably mounted on narrowed outer end of the guide shaft 32, by inner and outer ball bearing assemblies 41, 43. The outer race of the outer ball bearing assembly 43 has a flange 44 which defines a shoulder providing a fixed reference surface for the outer edge of the tape 15. A cap 45 is press fitted on the narrow and outer end of the guide shaft 32, in engagement with the inner race of the bearing 43, and maintains the roller assembly in fixed axial position along the shaft.

The operation of the roller mechanism of FIGS. 2 to 5 presents only low friction and low inertia in the path of the tape. The relatively thin shell of the roller 39 is the only part which must be moved with the tape. In one practical example, the friction was less than 0.010 in.-oz., and the moment of inertia less than $3.5 \times 10^{-6}$ oz.-in.-sec.$^2$. This element was employed in a system using a nominally ½" tape which has permissible width variations of from .500 to .495 inch. A spacing between the shoulder elements 44 and 37 of .494 to .495 inch was employed. The spring force exerted by the spring 36 was approximately 1 oz.

Rotation of the roller sleeve 39 frictionally engages only the ceramic washer 37, which may be of "Alsimag 614" or equivalent material. A tape 14 passing between the shoulders defined by the flange 44 and the washer 37 is constantly urged towards the fixed flange 44, irrespective of tape width variations. The spacing between the shoulders 37, 44 corresponds to the minimum tape width. Thus, if the average tape width increases within the permissible tolerance, or if edge waviness causes a cyclic increase, the movable shoulder defined by the washer 37 shifts to accommodate the greater width. The tape is acted on by equal and opposite forces, but is continually referenced to the fixed shoulder 44. If the tape for some reason is subjected to a major deviation from the nominal tape path, the movable washer 37 acts to return it to the proper position. The spring force is not so high as to effect a sudden lateral shifting across the roller 39, because the tape has no sliding movement relative to the roller 39. Instead, the tape is diverted sideways by the spring mechanism acting on the washer 37, and returns to engagement with the fixed shoulder 44 over a few revolutions of the roller 39. The sleeve 34 maintains the washer 37 in a plane normal to the plane of the tape, and insures that the washer 37 will move in a parallel plane to accommodate wider tape widths. Otherwise, the washer 37 would yield to the stiffened part of the tape wrapped about the roller, and all of the transverse force between the tape edge and washer would be concentrated at the two points at which the tape entered and left the roller. When the washer 37 is maintained parallel, however, these forces are evenly distributed through the entire line of contact of the tape and washer. Consequently, tracking variations in the tape are kept to a minimum consistent with the dimensional variations in the tape itself.

While there have been described above and illustrated in the drawings various forms of roller guides in accordance with the present invention, it will be appreciated that a number of alternative forms and modifications are feasible, so that the invention is to be defined solely by the appended claims.

What is claimed is:

1. A low inertia edge guiding roller guide for web transport systems comprising: a central guide shaft disposed transverse to the web, a rotary guide sleeve positioned concentric with the guide shaft and in contact with the web, a pair of low friction bearing members coupling the sleeve to the shaft, one of the bearing members having a radially outwardly extending flange in contact with one edge of the web, a ceramic washer disposed about the guide shaft on the opposite side of the web from the flanged bearing member, and having a shoulder surface in contact with the second edge of the web, an axially movable and rotatably fixed sleeve member disposed about the guide shaft adjacent to and attached to the ceramic washer, and spring means disposed about the sleeve member, and urging the sleeve member, the ceramic washer and the web in the direction toward the flanged bearing member.

2. A low inertia, low friction edge guiding roller guide for web transport systems comprising: a central guide shaft disposed transverse to the web, the central guide shaft defining a central axis extending past both the inner and the outer edges of a web moving adjacent thereto, a rotary guide sleeve positioned concentric with the guide shaft, and extending transversely from the inner to the outer edge of the web, a pair of low friction bearing members rotatably coupling the guide sleeve to the shaft, the outer one of the bearing members having a radially outwardly extending flange coupled to the guide sleeve and rotatable therewith and defining a shoulder for the outer edge of the web, a terminating cap member mounted on the free end of the guide shaft, and engaging the outer bearing member to maintain the guide sleeve in fixed axial relation along the guide shaft, a ceramic washer disposed about the guide shaft on the inner side of and adjacent to the rotary guide sleeve, and having a partially rounded surface in contact with the inner edge of the web, an axially movable and rotatably fixed sleeve member disposed about the guide shaft adjacent to the ceramic washer and affixed thereto, the sleeve member including an outer edge flange adjacent the ceramic washer and maintaining the ceramic washer in a plane normal to the plane of the tape, and spring means disposed about the sleeve member, and fixed at the inner end thereof, and engaging the flanged end of the sleeve member, such as to urge the sleeve member and the ceramic washer in the direction toward the web.

3. A roller guide for magnetic tape systems, comprising: a fixed central shaft positioned adjacent the path of tape movement and having a selected central axis normal thereto, a roller member rotatably mounted on the central shaft along the path of tape movement, the roller member including a rotatable shoulder element along one edge of tape movement, the roller member and rotatable shoulder element having a fixed axial position along the central shaft axis, means providing a second shoulder element on the opposite side of the roller member, the second shoulder element being fixed against rotation, and means urging the second shoulder element in the direction toward the magnetic tape.

4. A low friction, low moment of inertia roller guide for magnetic tape systems comprising a fixed central shaft positioned adjacent the path of tape movement and having a central axis normal thereto, a guide member rotatably mounted on the central shaft along the path of tape movement, the guide member including a rotatable shoulder element along one longitudinal edge of the tape, the guide member and shoulder element having a fixed axial position along the central shaft axis, the shoulder element providing a reference surface for one edge of the tape, means providing a second shoulder element on the opposite side of the guide member from the rotatable shoulder element, the second shoulder element being nominally separated from the rotatable shoulder element by a distance subtsantially equal to the minimum permissible tape width, the second shoulder element comprising a ceramic washer, an axially movable sleeve element coupled to the second shoulder element and disposed in non-rotating relation about the fixed central shaft, and spring means engaging the sleeve element, and urging the sleeve element toward the guide surface member with a force of the order of one ounce.

5. A roller guide device for a web member, comprising a central shaft, means defining a rotary sleeve about the shaft, the rotary sleeve including a rotary flange member, and being disposed in contact with the web, and with the flange member in contact with one edge of the web, and spring loaded means disposed on the opposite side of the rotary sleeve and axially movable in the direction toward the second side of the web, the spring loaded means including a ceramic contact surface disposed in contact with the second edge of the web, and sleeve means slidably mounted on the central shaft.

6. A rotary guide member for permitting intermittent operation of a tape member, while edge guiding the member, including the combination of a rotary sleeve member in contact with the tape member, the rotary sleeve member including a flange movable therewith in contact with an edge of the tape member, means axially fixed relative to the tape member for rotatably supporting the rotary sleeve member, and means slidably mounted on the sleeve supporting means and disposed along the axis of rotation of the rotary sleeve member and separate therefrom, and including an annular shoulder member in contact with a second edge of the tape and means mechanically biasing the annular shoulder member toward the tape member, and maintaining the plane of the shoulder member substantially normal to the plane of the tape member.

References Cited by the Examiner

UNITED STATES PATENTS

| | | | |
|---|---|---|---|
| 1,891,387 | 12/1932 | Maurer | 226—179 X |
| 2,164,748 | 7/1939 | Loomis et al. | 226—179 |
| 2,201,324 | 5/1940 | Sinclair | 226—179 |
| 2,258,759 | 10/1941 | Heacock | 226—179 |

FOREIGN PATENTS

| | | |
|---|---|---|
| 497,846 | 3/1929 | Germany. |
| 761,615 | 6/1953 | Germany. |

M. HENSON WOOD, Jr., *Primary Examiner.*

A. N. KNOWLES, *Assistant Examiner.*

UNITED STATES PATENT AND TRADEMARK OFFICE

CERTIFICATE OF CORRECTION

PATENT NO. : 3,276,651

DATED : October 4, 1966

INVENTOR(S) : Philip S. Bryer

It is certified that error appears in the above-identified patent and that said Letters Patent are hereby corrected as shown below:

In Fig. 1, near the center of the drawing below numeral "10", "31" should read --20-- (two occurrences); near the center of the drawing below numeral "10", "20" should read --30--.

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*